United States Patent
Lange et al.

(10) Patent No.: US 9,740,585 B2
(45) Date of Patent: Aug. 22, 2017

(54) FLEXIBLE CONFIGURATION AND CONTROL OF A TESTING SYSTEM

(71) Applicant: International Business Machines Corporation, Armonk, NY (US)

(72) Inventors: H. Eberhard Lange, Holzgerlingen (DE); Klaus Theurich, Gechingen (DE)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 14/747,111

(22) Filed: Jun. 23, 2015

(65) Prior Publication Data

US 2016/0378644 A1    Dec. 29, 2016

(51) Int. Cl.
| | | |
|---|---|---|
| G06F 11/00 | (2006.01) | |
| G06F 11/263 | (2006.01) | |
| G06F 11/36 | (2006.01) | |
| G06F 11/26 | (2006.01) | |

(52) U.S. Cl.
CPC ........ *G06F 11/263* (2013.01); *G06F 11/3684* (2013.01); *G06F 11/3688* (2013.01); *G06F 11/261* (2013.01)

(58) Field of Classification Search
CPC .. G06F 11/22; G06F 11/2205; G06F 11/2221; G06F 11/2236; G06F 11/2247; G06F 11/25; G06F 11/26; G06F 11/263; G06F 11/2635; G06F 11/3684; G06F 11/3688
See application file for complete search history.

(56) References Cited

U.S. PATENT DOCUMENTS

| | | | | |
|---|---|---|---|---|
| 5,745,767 A | * | 4/1998 | Rosen ................ | G06F 11/3684 714/E11.208 |
| 8,230,401 B2 | | 7/2012 | Branca et al. | |
| 9,032,373 B1 | * | 5/2015 | Gupta ................ | G06F 11/3688 717/127 |
| 2005/0166094 A1 | * | 7/2005 | Blackwell ........... | G06F 11/3664 714/38.14 |
| 2008/0282231 A1 | * | 11/2008 | R ........................ | G06F 11/3684 717/127 |
| 2009/0292952 A1 | * | 11/2009 | Merry ................ | G06F 11/3664 714/38.1 |
| 2014/0026125 A1 | * | 1/2014 | Pasala ................ | G06F 11/3684 717/126 |
| 2014/0033175 A1 | * | 1/2014 | Lee ..................... | G06F 11/3684 717/124 |

(Continued)

OTHER PUBLICATIONS

Lange et al., "Flexible Configuration and Control of a Testing System", U.S. Appl. No. 14/936,707, filed on Nov. 10, 2015, pp. 1-31.

(Continued)

*Primary Examiner* — Michael Maskulinski
(74) *Attorney, Agent, or Firm* — Fusheng Xu; Peter Hackmann (57) ABSTRACT

A method is provided to get a high test coverage through a large number of test cases with a minimum number of test programs. Tests are performed flexibly in various environments, using parameters in multiple dimensions. The parameters can be dynamically extracted from the machine or simulator either by controlling scripts or by the test program itself. Multiple ways are offered to execute subsets of the test combinations.

18 Claims, 4 Drawing Sheets

(56) References Cited

U.S. PATENT DOCUMENTS

| | | | |
|---|---|---|---|
| 2014/0075242 A1* | 3/2014 | Dolinina | G06F 11/3672 |
| | | | 714/27 |
| 2014/0173347 A1 | 6/2014 | Engebretsen et al. | |
| 2014/0281719 A1* | 9/2014 | Zlotnick | G06F 11/263 |
| | | | 714/32 |
| 2014/0380279 A1 | 12/2014 | Bartley et al. | |
| 2015/0007149 A1 | 1/2015 | Maddela | |
| 2015/0242304 A1* | 8/2015 | Akbulut | G06F 3/04842 |
| | | | 714/38.1 |

OTHER PUBLICATIONS

IBM Appendix P, list of patents and patent applications treated as related, Nov. 10, 2015, 2 pages.

Theurich, et al., "Advanced firmware verification using a code simulator for the IBM System z9", IBM J. Res. & Dev. vol. 51, No. 1/2 Jan./Mar. 2007, © 2007 IBM, pp. 207-216.

Wikipedia, The Free Encyclopedia, "Test management", noted by Inventor in Post Disclosure dated Dec. 1, 2014, <https://en.wikipedia.org/wiki/Test_management>, pp. 1-3.

Wikipedia, The Free Encyclopedia, "Traceability matrix", noted by Inventor in Post Disclosure dated Dec. 1, 2014, <https://en.wikiedia.org/wiki/Traceability_matrix>, p. 1-3.

* cited by examiner

FLEXIBLE CONFIGURATION AND CONTROL OF A TESTING SYSTEM

BACKGROUND

The present invention relates generally to the field of hardware, firmware and/or software engineering, and more particularly to a method of firmware and/or software testing.

Hardware, firmware and/or software testing is an investigation conducted to provide information about the quality of the firmware/software under test. Testing techniques include, but are not limited to, the process of executing a program or application with the intent of finding firmware/software_bugs (errors or other defects).

Testing methods include static testing, dynamic testing, white-box testing, black-box testing, and grey-box testing. Testing can also be categorized by the testing level that includes unit testing, integration testing, component interface testing, and system testing. Further, testing can be classified according to testing type that include installation testing, functional testing, and regression testing. In addition, testing can be conducted either manually or automatically.

A white-box testing tests internal structures or workings of a program, as opposed to the functionality exposed to end-users. In white-box testing, an internal perspective of the system, as well as programming skills, are used to design test cases. A tester chooses inputs to exercise paths through the code and determines the appropriate outputs. A white-box testing can be applied at the unit, integration and system levels of the firmware/software testing process.

SUMMARY

In one aspect of the present invention, a method, a computer program product, and a system includes: receiving a plurality of sets of configuration data, each set of configuration data of the plurality of sets of configuration data specifying a given computer system; receiving a set of configuration types and a set of test programs, each configuration type of the set of configuration types being specified by a set of configuration data of the plurality of sets of configuration data; generating a logic matrix of test cases from the set of configuration types and the set of test programs, each test case of the logic matrix of test cases including a corresponding configuration type and a corresponding test program; selecting a set of test cases from the logic matrix of test cases; and performing the set of test cases; wherein: at least the step of performing the set of test cases is performed by computer software running on computer hardware; each configuration type of the set of configuration types having: (i) a first set of conditions from the given computer system; (ii) a first set of qualifiers; and (iii) a first set of control indications; each test program of the set of test programs having: (i) a second set of conditions based, at least in part, on the given computer system and the set of configuration types; (ii) a second set of qualifiers; and (iii) a second set of control indications; and the given computer system is one of: (i) a real hardware computer system; and (ii) a simulated computer system.

DETAILED DESCRIPTION

A method including techniques for both manual and automatic execution of test cases is provided for testing firmware/software as well as underlying hardware. Each test case comprises a test program combined with a set of parameters. Within a given testing environment some parameter sets may exist while other parameter sets do not. A program or script uses lists of test programs and lists of parameter sets to dynamically form a logical matrix of test cases, i.e., test combinations. Each test program and each parameter set has its own applicable conditions. From the matrix, a user (e.g., a tester) or an automated process can select all or subsets of the test cases (combinations) for execution. In some embodiments, qualifiers and controls can be defined for flexible test case selection and execution.

A method is provided to get a high test coverage through a large number of test cases with a minimum number of test programs. Tests are performed flexibly in various environments, using parameters in multiple dimensions. The parameters can be dynamically extracted from the machine or simulator either by controlling scripts or by the test program itself. Multiple ways are offered to execute subsets of the test combinations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
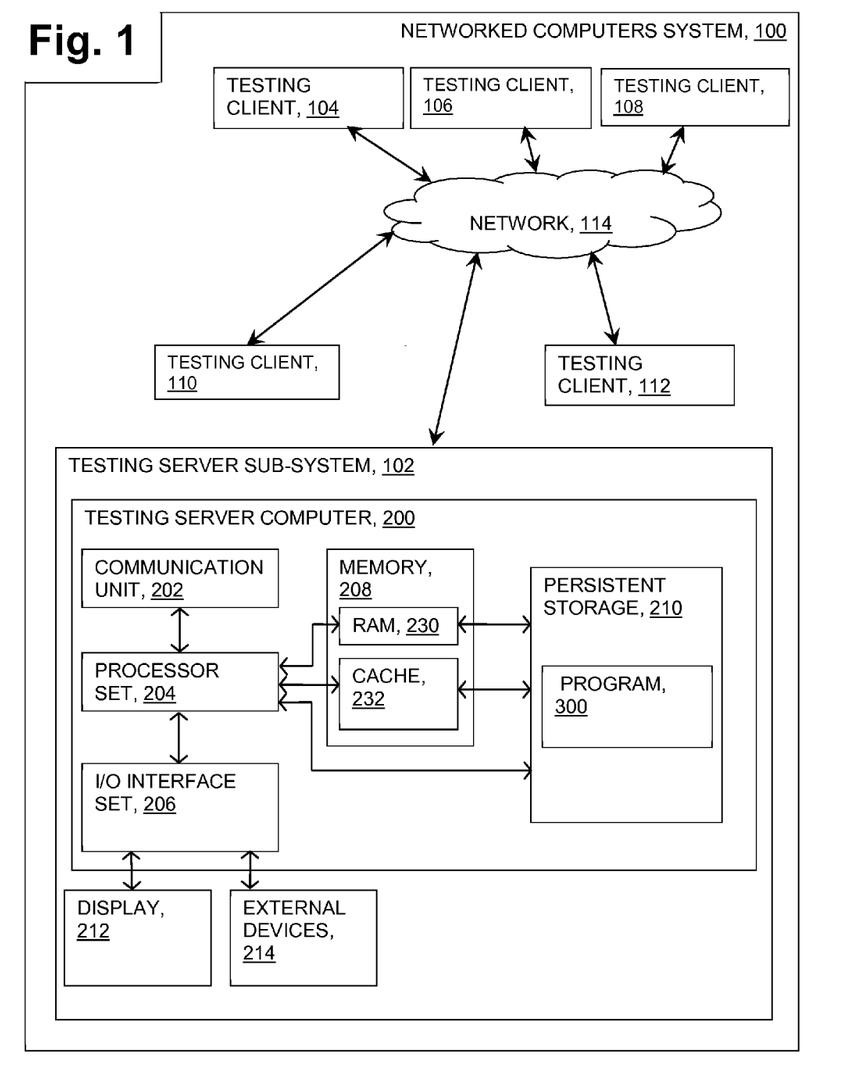
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: testing server sub-system 102; testing clients 104, 106, 108, 110, 112; communication network 114; testing server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, a mainframe computer, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210 stores the program (including its soft logic and/or data) on a tangible medium (such as magnetic or optical domains). Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Program 300 operates to flexibly control test executions by lists, matrices and parameters, which effectively multiply the actual number of test programs to form many more test cases. The lists, matrices, and parameters may be stored in files, data bases, or even obtained dynamically. Program 300 allows significantly flexible partial, complete, or random execution of test cases for either unit testing or regression testing.

Some embodiments of the present invention recognize the following facts, potential problems and/or potential areas for improvement with respect to the current state of the art: (i) a static test matrix is directly formed from static requirements and test cases; following two links; (ii) handloops are known with hard coded values, lacking automatic verification of results needed for regression; (iii) test systems are known adapting to the system they detect and run random regression tests results; (iv) lists of test programs are used for each type in each configuration of each machine generation; and/or (v) test software is known using configuration parameters to improve usage of test programs.

For illustrative purpose only, some embodiments are described for firmware testing based on IBM System z machine, which do not limit the scope of the present invention. (Note: the term(s) "IBM" and/or "System z" may be subject to trademark rights in various jurisdictions throughout the world and are used here only in reference to the products or services properly denominated by the marks to the extent that such trademark rights may exist.)

In addition to typical unit test environments, in which only certain parts of a system are considered, the need for a full system model is increasingly important given the growing complexity of systems. Such comprehensive testing is crucial for the IBM System z, with its huge firmware stacks in various subsystem. For reasons of cost and product development time, each firmware component must be verified using a simulation environment.

Some embodiments of the present invention use CECSIM (central electronic complex simulator) to perform firmware simulations. In this case CECSIM is a simulator of a mainframe, running on an actual mainframe. CECSIM provides a set of advanced debug features and is an essential part of the firmware development process for the IBM System z. CECSIM provides a simulated system environment for firmware test and verification, in which the majority of the firmware can be tested without requiring actual hardware and in which the developer is supported by enhanced debug capabilities.

Conventionally, developers write small assembly language programs for unit tests. In many cases, these programs are not very flexible, and they must be modified each time to work with another configuration or in another environment. Also they have no built-in capabilities such as those needed for diagnostic messages and tracing. All of these programs run at the z/Architecture level (i.e., System z architecture) and thus have no access to firmware-specific components in the system. Therefore, they can verify the correctness of the system behavior only at that architecture level. Verification interface for system architecture (VISA) is a test-case framework having capabilities of solving the above drawbacks. VISA is based on a small operating system kernel with a C runtime library, and runs services and test programs on top of it. In some embodiments of the present invention, the VISA runs in the CECSIM platform. In some embodiments of the present invention, the VISA runs on the actual machine. When running in a simulation environment, for example, CECSIM, VISA may utilize interfaces to the simulator in order to access internal information that is not available at the architecture level. In addition, VISA has a capability of configuring test programs via parameters at runtime.

Figure 2:
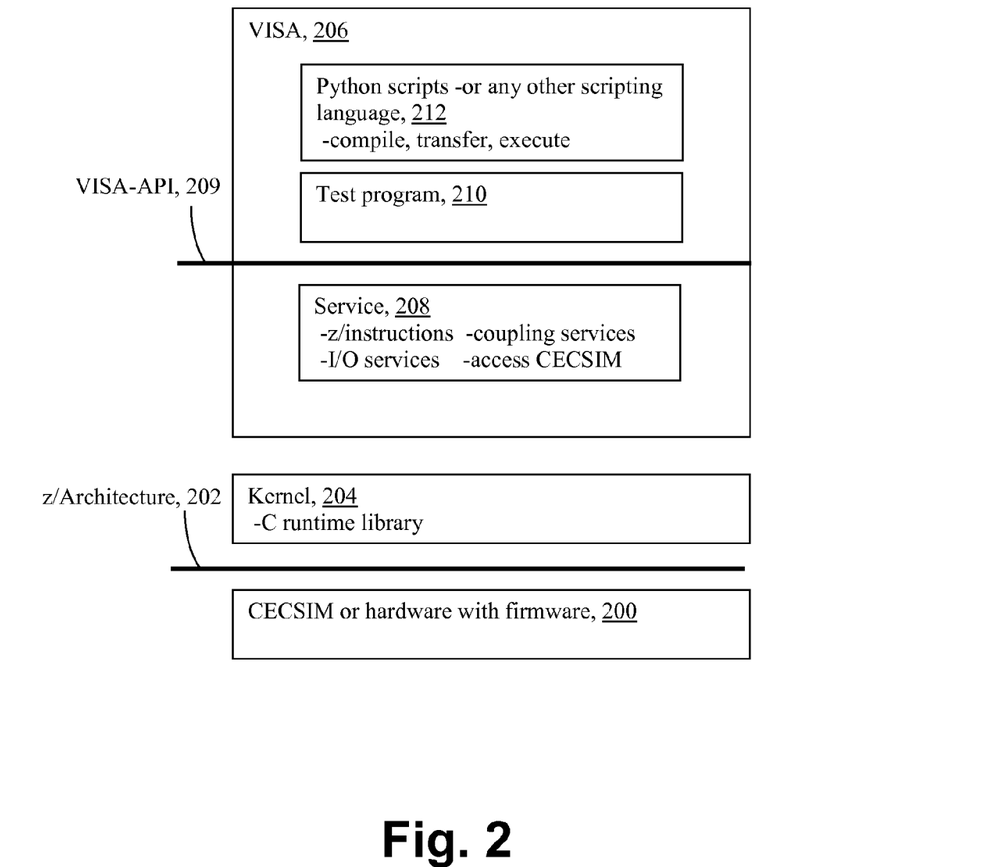
FIG. 2 is a schematic test environment including VISA structure (verification interface for system architecture)

A test environment is structured, as shown in FIG. 2, including, VISA 206, CECSIM or hardware with firmware 200, kernel with C runtime library 204, service 208, test programs 210, and PYTHON scripts—or any other scripting language 212. Line 202 indicates that VISA runs at the z/Architecture level within CECSIM or on an actual hardware system. Line 209 indicates VISA API (application programming interface) that is the interface between the functionalities represented by test programs 210 and the service 208.

VISA supports multiple processors and offers, for example, the flexibility required to install private signal handlers in order to track and handle interrupt conditions. VISA service 208 including z/instruction, coupling services, I/O (input/output) service, access CECSIM, and trace console, forms the VISA API that makes it easy to write test programs. VISA services relieve a test program writer from various details and at the same time allow the writer to handle details and inject errors wherever needed, even at the lowest levels of the testing process. This capability is created by offering many levels of service subroutines. Further, the VISA services help the test program writers to concentrate on the subject of their tests, the firmware code. With VISA, the test program writers obtain easily maintainable test programs, output that is easy to read, systematic error messages, and efficient regression-run capability.

VISA test programs 210 are executed directly on the z/Architecture from an internal control program (i.e., a small kernel 204 running on a real machine or CECSIM). Visa test programs are compiled and linked together to one unit, which is transferred and executed, for example on testing computer 200 in FIG. 1. The control program prompts for both kinds of information: (i) name of a test program to be executed next; and (ii) parameter values (i.e., configuration data) to be used, which may be entered by a user from, for example, testing clients 104,106,108,110, and 112. As mentioned, VISA services are offered for checking tracing, and for accessing CECSIM, for example, in order to inject errors or analyze firmware internal data. In some embodiments of the present invention, each step within a VISA test program can perform some or all of the following functions: (i) allocate space for control blocks and enter the data; (ii) set up error injection; (iii) call the subroutine to execute the instruction and indicate expected condition codes; (iv) check the condition code (a service writes traces if the code is unexpected); and/or (v) check the resulting data.

In some embodiments, VISA test program 210 and service 208 are linked with kernel 204 as library into one single bind (e.g., a filed called visa.txtbin). Visa.txtbin is compiled and bound, then transferred from client to server, further loaded and started through scripts 212, and executed on CECSIM or hardware with firmware 200.

VISA scripts control the execution of VISA test cases. The execution of a series of test cases may be stopped when an error occurs. In conjunction with CECSIM and machine features that permit single-stepping of instructions, comprehensive debug capabilities are available. VISA scripts may be written with Python, as shown in FIG. 2, which is an interpreted programming language. Alternatively, VISA scripts may be written using other interpreted programming languages, for example, Bash, Scons, and REXX. All available commands may be issued from the VISA scripts, and an extract facility allows data to be retrieved and stored in variables. Such data includes memory and register contents, addresses of i390 (internal 390 that implements functions such as the channel-subsystem, recovery, and power-on-reset) routines and data structures, and current configuration information that includes the number of CPUs, the memory size, and the number of I/O hubs. Those scripts run on a client computer (e.g., testing clients 104.106.108.110 and 112 in FIG. 1) and control the execution of test cases. Alternatively, those scripts may run on a server, for example, testing computer 200 in FIG. 1. (Note: the term(s) "Python", "Bash", "Scons", and/or "i390" may be subject to trademark rights in various jurisdictions throughout the world and are used here only in reference to the products or services properly denominated by the marks to the extent that such trademark rights may exist.)

VISA scripts that execute VISA test programs use control files. One file contains a matrix of related test programs and one or more applicable types, e.g., I/O channel types. This is required for automated regression runs, but manual execution of a single test case may also make use of this file. Additionally, files are available that contain the prepared configuration-specific data to be transferred when prompted by a test program. When a new I/O configuration data set (IOCDS) for CECSIM is being prepared, effort is required to create these files so that test cases can make use of them. (IOCDS provides a software view of the I/O hardware)

For each environment, for example, a simulated machine of a given generation with an I/O hardware configuration and an IOCDS, multiple sets of parameters are offered, each set with a name called configuration type supported in the hardware configuration. As shown in Tables 1, examples of some I/O hardware configurations and their associated configuration types are provided. In Tables, IO hardware configuration 1 includes type OSM 256, and type FC 5CC; IO hardware configuration 2 includes type OSD 253, type OSE 255, and type FCP 5CD.

TABLE 1

IO hardware configurations and their associated configuration types

| IO Configuration 1 | IO Configuration 2 |
|---|---|
| OSM 256 | OSD 253 |
| FC 5CC | OSE 255 |
|  | FCP 5CD |

The types have attributes having values that comprise the parameter data set for each type. As shown in Table 2 below, type OSM 256 includes, but not limited to, the following attributes and their associated values: MCSS=1; SSID[0]=0; CSSID[0]=0; LPARNUM[0]=1; DEV[0]=2560; and DEVCNT[0]=10.

TABLE 2

Example of attributes of type OSM 256

| MCSS | 1 | SSID[0] | 0 |
| CSSID[0] | 0 | LPARNUM[0] | 1 |
| DEV[0] | 2560 | DEVCNT[0] | 10 |

Figure 3:
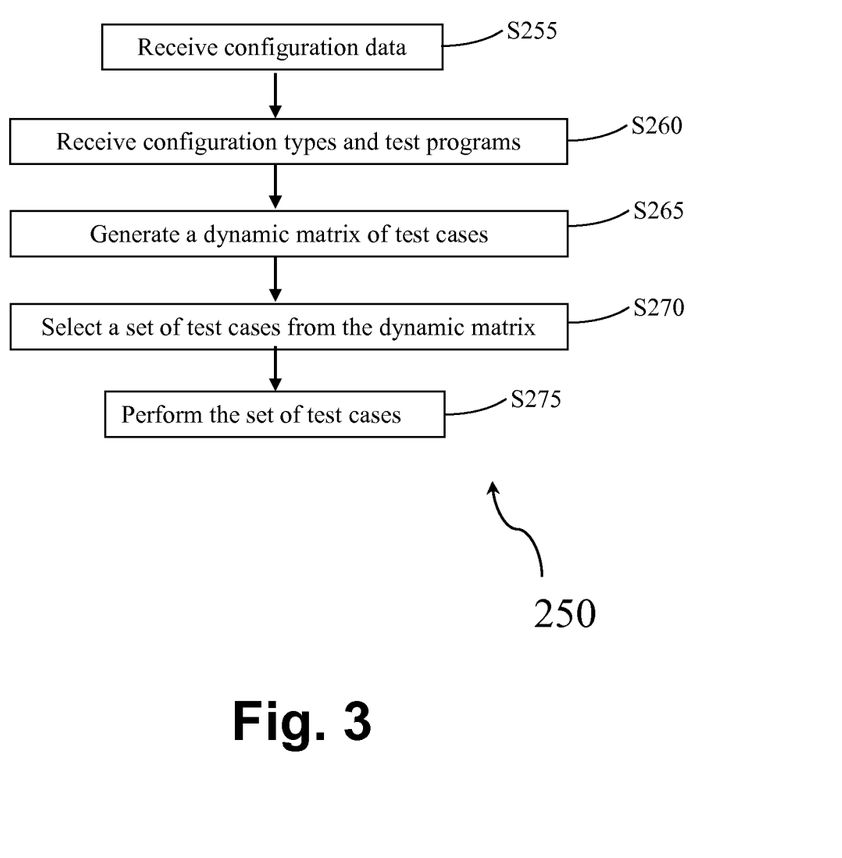
FIG. 3 is a flowchart showing a method performed, at least in part, by the first embodiment system.
Figure 4:
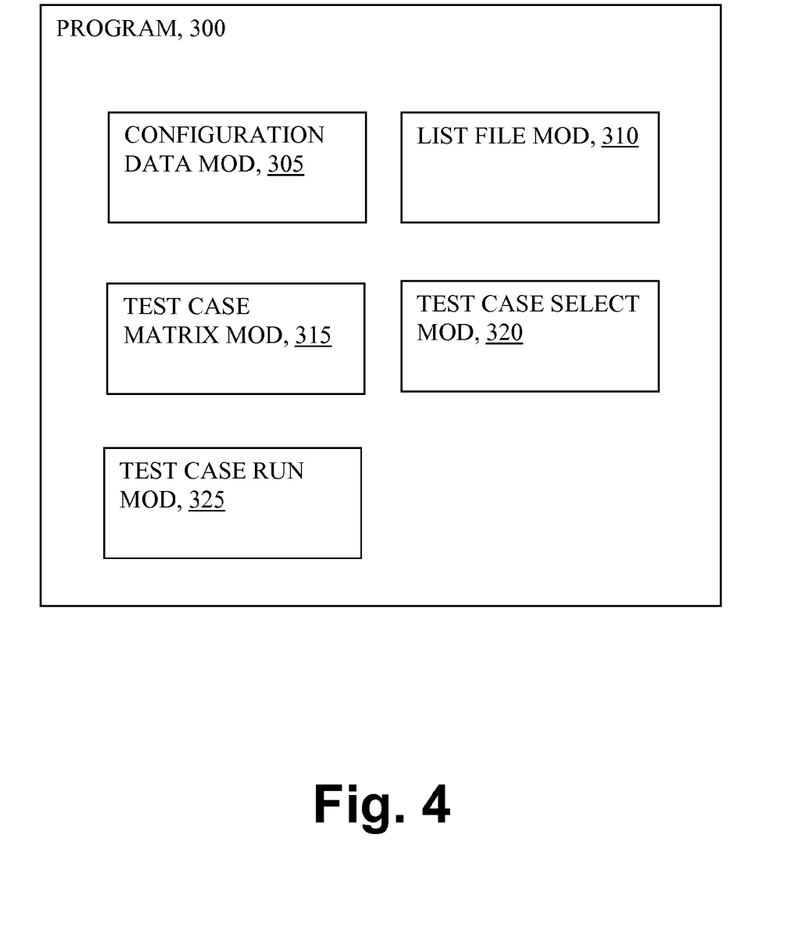
FIG. 4 is a schematic view of a machine logic (for example, software) portion of the first embodiment system.

FIG. 3 shows flowchart 250 depicting a first method according to the present invention. FIG. 4 shows program 300 for performing at least some of the method steps of flowchart 250. This method and associated software will now be discussed, over the course of the following paragraphs, with extensive reference to FIG. 3 (for the method step blocks) and FIG. 4 (for the software blocks).

Processing begins at step S255, where configuration data module "mod" 305 receive configuration data. In this exemplary embodiment, the configuration data are obtained by scripts (e.g., written using Python) from a file. The scripts run on a testing client, for example, testing clients 104,106, 108,110 and 112 in FIG. 1. The file may be manually created or automatically generated by extracting the data from other datasheet sources. The file and the other datasheet sources may be stored on a testing client as 104, 106, 108,110 and 112 or on a server as testing computer 200 in FIG. 1. Table 3 shows sample configuration data obtained from a file. In Table 3, SER and FC are two configuration types; and ssid, cssid, iid, device[0], devcnt[0], and chid[0] are attributes of configuration types. SER and FC have different attribute values.

TABLE 3 sample of configuration data

|  | SER | FC |
|---|---|---|
| ssid | 0 | 0 |
| Cssid | 0 | 0 |
| Iid | 1 | 1 |
| Device[0] | 1180 | 5210 |
| Devcnt[0] | 1 | 16 |
| Chid[0] | 111 | 521 |

In some embodiments, the configuration data may be extracted from a real hardware machine or a simulator (e.g., CECSIM) through controlling scripts, for example from a CEC accessing internal data structures. Alternatively, the configuration data may be obtained through test programs (referred to as dynamic self-configuration). In some embodiments, the configuration data may be extracted by combining a file and dynamic self-configuration.

In this example, the configuration data are read line by line from the file in form of one or more strings, and are handed over to an internal control program. The configuration data are stored as parameters in memory, for example as a dictionary (e.g., stored on a testing client as 104, 106, 108, 110 and 112 or on a server as testing computer 200 in FIG. 1) accessible from the test programs. In some embodiments, the configuration data received from a file are merged with additional configuration data that are obtained from a real hardware machine or a simulator (e.g., CECSIM) through controlling scripts, for example from a CEC accessing internal data structures, or through dynamic self-configuration.

Processing proceeds to step S260, where list file module 310 receive a list of configuration types and a list of test programs. In this exemplary embodiment, both the list of configuration types and the list of test programs are obtained by scripts (e.g., written using Python) from a same file and are stored in memory as a dictionary. The file may be a table containing both lists in a database system. The file may be manually created or automatically generated by extracting the data from other datasheet sources. Alternatively, the list of configuration types and the list of test programs may be extracted from two different files, one containing the list of configuration types and the other containing the list of test programs.

To assist selecting allowed test cases, i.e., combinations of test programs and parameter sets (configuration types), lists of configuration types are formed describing conditions when a parameter set is applicable depending on the environment. Using meaningful names for the configuration types or even groups of such, helps to form conditions in the test programs list. A sample list of configuration types is given in Table 4.

TABLE 4 a sample list of configuration types

| Qualifier | Configuration Type | Condition | Controls |
|---|---|---|---|
| n | ctc | lpar == 0 or fit_lpar | Failure notify xyz |
| n | ser | lpar == 0 or fit_lpar | Failure notify abc |
| q | fc | lpar == 0 or fit_lpar | Failure notify def |

The qualifier q determines that this configuration type (for all test programs) belongs to a "quick" (i.e., small and quickly executable) subset of test cases; such subset can be chosen for execution. The qualifier n determines that the configuration type (for all test programs) belongs to a "normal" subset of test cases, as opposed to the "quick" subset. The conditions in the list of configuration types are written in a language reading the lists, e.g., Python. When the respective line is read, the condition is extracted as string, given to a command interpreter and executed by that language processor.

The configuration types have certain attributes from the configuration data, and these attributes are checked by the conditions in the list of configuration types. Configuration types that are not applicable are dropped, for example, for the sample configuration data in Table 3, only the types SER and FC are offered as columns of Table 3.

In this example, the test programs list is maintained manually together with the test programs, and is valid across all environments through the programmed conditions in the test program list. The conditions indicate which configuration types and test programs are applicable. For each test program there can be a condition, depending on the environment and on the configuration type, where it is applicable or not. A sample list of test programs is given in Table 5.

TABLE 5 a sample list of test programs

| Qualifier | Test Program | Condition | Controls |
|---|---|---|---|
| q | msch00 |  | Src 269a0404 |
| n | ssch01 | ct != 'iqd' | Src |
| n | csch20 | Ct not in ['cby', 'iqd'] and vc['devcnt[0]'] >1 and lpar == 0 | Src 28000001 22432004 |

The qualifier q (also referred to as selection control) in the test program list as shown in Table 5, determines that this test program belongs to a "quick" subset of test cases; this subset—logically matched with the "quick" configuration types subset—can be chosen for execution. The test programs are checked by the condition in the list. The test programs' conditions—using the configuration types and the configuration data—determine which types are applicable for the test program. The execution of the conditions is like for the configuration types. For example, in Table 5, the configuration types 'iqd' and 'cby' are not offered at all in the sample of configuration data in Table 3, therefore this part of the condition is not relevant. But for csch20, only the configuration type 'FC' is applicable because it offers devcnt [0]>1. If the current environment is within lpar 1, csch20 is not applicable; it can only be executed outside of a logical partition in host mode (lpar=0).

The control column in the test programs list as shown in Table 5 can modify pre-processing and post-processing of a test case, for example verify that some specified logs can or must have happened or have not occurred during the execution. The control might also include the automatic notification of a person (e.g., via email) upon a failure.

These lists are valid for all listed configuration types in all machine generations and machine configurations; conditions referring to the configuration types' attributes control which test programs apply for which types on which machine configuration.

Processing proceeds to step S265, where test case matrix module 315 dynamically generates a logic matrix of test cases containing configuration types and test programs. As mentioned, the configuration types have certain attributes from their parameter data, and these attributes are checked by the conditions in the test programs list. Other conditions may check the environment, for example the machine generation or whether running as host on the machine or in a partition.

In this example, a logical matrix of test cases is formed dynamically, e.g., by an executing Python script: from the list of configuration types, the applicable types are taken and being used as column heads of the matrix; and from the test programs list, each line is forming a line of the matrix. Depending on the conditions in the test programs list, a matrix box, i.e., the combination of a test program and a configuration type, may either be applicable or not. In addition, the qualifiers of the configuration types and test programs together can determine new entities, e.g., a quick subset of test cases, for execution. And the controls of the configuration types and test programs together form the control being used for each individual test case. They can be merged, e.g., such that a specific control of the test program wins over this control of the configuration type if specified in both.

Table 6 shows a schematic logic matrix of test cases. In Table 6, Types 1-4 represent the configuration types along with their conditions (under which the types are applicable); Test 1-4 represent the test programs along with their conditions (and additionally, e.g., with post recessing options). A combination of type and test program forms a test case. "yes" in Table 6 indicates that a test case is applicable, while "n/a" in Table 6 indicates a test case is not applicable. For example, assuming that Type 1 is a configuration type "ser" in Table 4 and Test 2 is a test program "csch20" in the test program list shown in Table 5, one attribute of the running environment of test case is "lpar=0", from the condition of type "ser" in Table 4, "lpar=0" is satisfied, and from the condition of test program "csch20" in Table 5, "devcnt[0]" is greater than 1, but from the configuration data in Table 3, the attribute value of "devcnt[0]" is equal to 1, thus, the combination (i.e., test case) of type "ser" and test program "csch20" is not applicable (i.e., n/a in Table 6).

TABLE 6 a schematic logic matrix of test cases dynamically created

| Test No. | Type1 | Type2 | Type3 | Type4 |
|---|---|---|---|---|
| Test1 | yes | n/a | yes | n/a |
| Test2 | n/a | n/a | yes | n/a |
| Test3 | yes | n/a | n/a | n/a |
| Test5 | n/a | n/a | yes | yes |

Further, from several such configuration type lists and test program lists, multiple matrices can be formed, and several test cases may be executed in one single command.

Processing proceeds to step S270, where test case selection module 320 selects a set of test cases from the matrix of test cases to run. Multiple ways are offered to execute test cases from the dynamically generated matrix of test cases, for example, from such a matrix, all test cases, a certain column (i.e., configuration type), a certain line (i.e., test program), or groups of lines may be selected to be executed. Further, combinations thereof or certain sub-entities of these defined by the qualifier (e.g., a "quick" subset of test cases) may be selected. Additionally, it is allowable to choose test cases randomly.

In this example, a user request (also referred to as arguments) is provided through scripts to determine what is executed: for example, just a single box in the matrix (i.e., test case), a line (i.e., a test program executed several times with different types' configuration data), or a column (one configuration type selected for all applicable test programs with the configuration data of this type). Thus, using the selection control (i.e., the qualifier), conditions and stored types, the applicable test programs and their types are determined.

These tests in the matrix can cover different environments (e.g., machine configurations and even machine generations), and the test programs can be run on different levels—either native on the CEC or within one or more partitions of a virtual machine or hypervisor. One set of configuration data is required for each configuration type, but running native or in different partitions is supported with the same parameters by dynamic self-configuration. The types and test programs lists are valid across all environments through the programmed conditions indicating which types and test programs are applicable.

Processing ends at step S275, where test case run module 325 execute the set of test cases selected from the dynamically formed matrix. The test programs of the test cases are executed from an internal control program on a platform (i.e., a small kernel running on a real or simulated machine); the control program prompts for both kinds of information: name of the test program to be executed next; parameter values (configuration data) to be used. In this example, for each test case (a box in the matrix, i.e., a combination of test program and type): a script applies pre-processing as told by the configuration type's control field and the test program's control field; and the script determines and sends a test program name upon prompt. Further, the script takes the configuration data from the wanted configuration type and answers configuration data upon prompt.

In some embodiments, the configuration data may be given anew (e.g., from externally controlling scripts) for each test case executed. To support execution without external script control (e.g., on a real machine), partial binds can be built containing just the wanted test programs, and configuration data may remain valid for multiple test programs execution one after the other.

The test program of each selected test case executes instructions and fetches data, for example, to perform dynamic self-configuration by accessing the simulator (e.g., CECSIM) or the hardware of a real machine to find additional missing configuration data details. After execution, the test program puts a return code into a pre-defined memory location, and the script extracts the return code from the memory. Further, the scripts performs the post-processing as specified in the control field of the test program.

Some embodiments of the present invention may include one, or more, of the following features, characteristics and/or advantages: (i) a logical test case matrix can be dynamically generated from configuration types and test programs; (ii) lists of configuration types with attributes are employed where each of these types contains parameter sets (configuration data) to be used in the test programs; (iii) lists of test programs define the logical dependencies from the configuration types and the environment; (iv) a test system is usable for unit test and regression test, and is able to verify the test results automatically; (v) configuration data can be given using scripts from either files or obtained dynamically; (vi) the test program itself can find out how it is running and perform necessary pre-programmed adaptions, thus reducing the amount of data needed in configuration files; (vii) the actual number of test programs can be effectively multiplied to form many more test cases, allowing flexible partial, complete or random execution; (viii) the test system can be used for unit testing, integration testing, component interface testing, system testing, and regression testing; (ix) the configuration types lists and test programs lists are valid across all environments through the programmed conditions indicating which types and test programs are applicable; (x) tests can cover many different environments (e.g., machine configurations and machine generations); (xi) the test programs can be run on different levels (e.g., native on the CEC, within one or more partitions of a virtual machine, or hypervisor); (xii) test on the different levels of the testing process might use the same file of configuration data; and/or (xiii) a high test coverage can be obtained through a large number of test cases with a minimum number of test programs.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer program product for testing hardware, software and/or firmware, the computer program product comprising a non-transitory computer readable storage device having stored thereon:

first program instructions programmed to receive a plurality of sets of configuration data, each set of configuration data of the plurality of sets of configuration data specifying a given computer system;

second program instructions programmed to receive a set of configuration types and a set of test programs, each configuration type of the set of configuration types being specified by a set of configuration data of the plurality of sets of configuration data;

third program instructions programmed to generate a logic matrix of test cases from the set of configuration types and the set of test programs, each test case of the logic matrix of test cases including a corresponding configuration type and a corresponding test program;

fourth program instructions programmed to select a set of test cases from the logic matrix of test cases; and fifth program instructions programmed to perform the set of test cases;

wherein:

at least the step of performing the set of test cases is performed by computer software running on computer hardware;

each configuration type of the set of configuration types having: (i) a first set of conditions from the given computer system; (ii) a first set of qualifiers; and (iii) a first set of control indications;

each test program of the set of test programs having: (i) a second set of conditions based, at least in part, on the given computer system and the set of configuration types; (ii) a second set of qualifiers; and (iii) a second set of control indications; and the given computer system is one of: (i) a real hardware computer system; and (ii) a simulated computer system.

2. The computer program product of claim 1, wherein each set of configuration data of the plurality of sets of configuration data includes at least one of: (i) a first set of configuration data pre-defined in a file; and (ii) a second set of configuration data dynamically extracted from the given computer system.

3. The computer program product of claim 1, wherein the set of test cases being selected includes at least one of: (i) all test cases in the matrix; (ii) a single test case; (iii) a certain configuration type column including all applicable test programs for such column; (iv) a certain test program line including all applicable configuration types for such line; and (v) any other subset of test cases including random selection.

4. The computer program product of claim 1, wherein at least the step of selecting a set of test cases from the logic matrix of test cases can partially be conducted using scripts, the scripts being written with any interpreted programming language.

5. The computer program product of claim 1, wherein the step of generating a logic matrix of test cases from the set of configuration types and the set of test programs includes:

generating each test case with a qualifier, a set of control indications, and a configuration type by checking the first set of conditions, the first set of qualifiers, and the first set of control indications of each of the set of configuration types with the second set of conditions, the second set of qualifiers, and the second set of control indications of each of the set of test programs.

6. The computer program product of claim 1, wherein the step of performing the set of test cases includes, for each test case:

applying pre-processing based, at least in part, on the control indications of the corresponding test program;
running the corresponding test program; and
applying post-processing based, at least in part, on the control indications of the corresponding test program.

7. The computer program product of claim 1, wherein each test case of the logic matrix of test cases runs on any one of levels including: (i) a logic partition on a virtual machine; and (ii) a host mode on CECSIM.

8. The computer program product of claim 1, wherein each test case of the logic matrix of test cases uses the plurality of sets of configuration data on any one of levels including: (i) a logic partition on a virtual machine; and (ii) a host mode on CECSIM.

9. The computer program product of claim 1, wherein performing the set of test cases operates on any one of testing levels including: unit testing, integration testing, component interface testing, and system testing.

10. A computer system for testing hardware, software and/or firmware, the computer system comprising:

a processor(s) set; and
a non-transitory computer readable storage device;
wherein:
the processor set is structured, located, connected, and/or programmed to run program instructions stored on the non-transitory computer readable storage device; and
the program instructions include:
first program instructions programmed to receive a plurality of sets of configuration data, each set of configuration data of the plurality of sets of configuration data specifying a given computer system;
second program instructions programmed to receive a set of configuration types and a set of test programs, each configuration type of the set of configuration types being specified by a set of configuration data of the plurality of sets of configuration data;
third program instructions programmed to generate a logic matrix of test cases from the set of configuration types and the set of test programs, each test case of the logic matrix of test cases including a corresponding configuration type and a corresponding test program;
fourth program instructions programmed to select a set of test cases from the logic matrix of test cases; and
fifth program instructions programmed to perform the set of test cases;
wherein:
at least the step of performing the set of test cases is performed by computer software running on computer hardware;

each configuration type of the set of configuration types having: (i) a first set of conditions from the given computer system; (ii) a first set of qualifiers; and (iii) a first set of control indications;
each test program of the set of test programs having: (i) a second set of conditions based, at least in part, on the given computer system and the set of configuration types; (ii) a second set of qualifiers; and (iii) a second set of control indications; and
the given computer system is one of: (i) a real hardware computer system; and (ii) a simulated computer system.

11. The computer system of claim 10, wherein each set of configuration data of the plurality of sets of configuration data includes at least one of: (i) a first set of configuration data pre-defined in a file; and (ii) a second set of configuration data dynamically extracted from the given computer system.

12. The computer system of claim 10, wherein the set of test cases being selected includes at least one of: (i) all test cases in the matrix; (ii) a single test case; (iii) a certain configuration type column including all applicable test programs for such column; (iv) a certain test program line including all applicable configuration types for such line; and (v) any other subset of test cases including random selection.

13. The computer system of claim 10, wherein at least the step of selecting a set of test cases from the logic matrix of test cases can partially be conducted using scripts, the scripts being written with any interpreted programming language.

14. The computer system of claim 10, wherein the step of generating a logic matrix of test cases from the set of configuration types and the set of test programs includes:

generating each test case with a qualifier, a set of control indications, and a configuration type by checking the first set of conditions, the first set of qualifiers, and the first set of control indications of each of the set of configuration types with the second set of conditions, the second set of qualifiers, and the second set of control indications of each of the set of test programs.

15. The computer system of claim 10, wherein the step of performing the set of test cases includes, for each test case:

applying pre-processing based, at least in part, on the control indications of the corresponding test program;
running the corresponding test program; and
applying post-processing based, at least in part, on the control indications of the corresponding test program.

16. The computer system of claim 10, wherein each test case of the logic matrix of test cases runs on any one of levels including: (i) a logic partition on a virtual machine; and (ii) a host mode on CECSIM.

17. The computer system of claim 10, wherein each test case of the logic matrix of test cases uses the plurality of sets of configuration data on any one of levels including: (i) a logic partition on a virtual machine; and (ii) a host mode on CECSIM.

18. The computer system of claim 10, wherein performing the set of test cases operates on any one of testing levels including: unit testing, integration testing, component interface testing, and system testing.

* * * * *